United States Patent

[11] 3,603,173

[72] Inventor Peter Brooks
 South Bend, Ind.
[21] Appl. No. 879,674
[22] Filed Nov. 25, 1969
[45] Patented Sept. 7, 1971
[73] Assignee The Bendix Corporation

[54] CENTER CORE FOR A LAMINATED COUPLING
 8 Claims, 2 Drawing Figs.
[52] U.S. Cl. .................................................. 74/581
[51] Int. Cl. .................................................. G05g 5/00
[50] Field of Search .......................................... 74/581,
 579; 287/81; 308/26, 27; 64/11, 12

[56] References Cited
 UNITED STATES PATENTS
3,370,483 2/1968 Ditlinger ...................... 74/579

3,475,988 11/1969 Ditlinger et al. ............... 74/579

Primary Examiner—Milton Kaufman
Assistant Examiner—F. D. Shoemaker
Attorneys—C. F. Arens and Plante, Arens, Hartz, Smith and Thompson ABSTRACT: A laminated coupling used to connect a helicopter rotor arm to a rotor blade includes a pair of spaced end bushings interconnected by an endless belt. A pair of annular clips encircle the belt adjacent the bushings to define a center section of the coupling having generally parallel sides defining an opening between them. A core piece composed of a plurality of relatively rotatable laminations is disposed in the opening between the clips to maintain separation of the clips and to permit twisting of the coupling about an axis extending through the bushings.

PATENTED SEP 7 1971

3,603,173

INVENTOR.
PETER BROOKS
BY
Plante, Arens, Hartz, Smith & Thompson
ATTORNEYS

CENTER CORE FOR A LAMINATED COUPLING

BACKGROUND OF THE INVENTION

This invention relates to a laminated coupling.

Couplings of the type having a pair of end bushings interconnected by a laminated belt, also know as "tie bars," have been widely used in recent years to secure helicopter rotor arms to the rotor blades. Such couplings must be able to withstand relatively large axially applied forces, yet must also be relatively light in weight. These couplings must also have low torsional stiffness, since helicopter design requirements necessitate that the couplings be able to twist through an angle as large as 90° without offering high resistance. The couplings also must have a long service life while operating in an adverse environment, such as in an oil bath.

SUMMARY OF THE INVENTION

Therefore, an important object of my invention is to increase the oil resistance, heat resistance, and wear resistance of laminated couplings.

Another important object of my invention is to decrease the torsional stiffness of laminated couplings.

Figure 1:
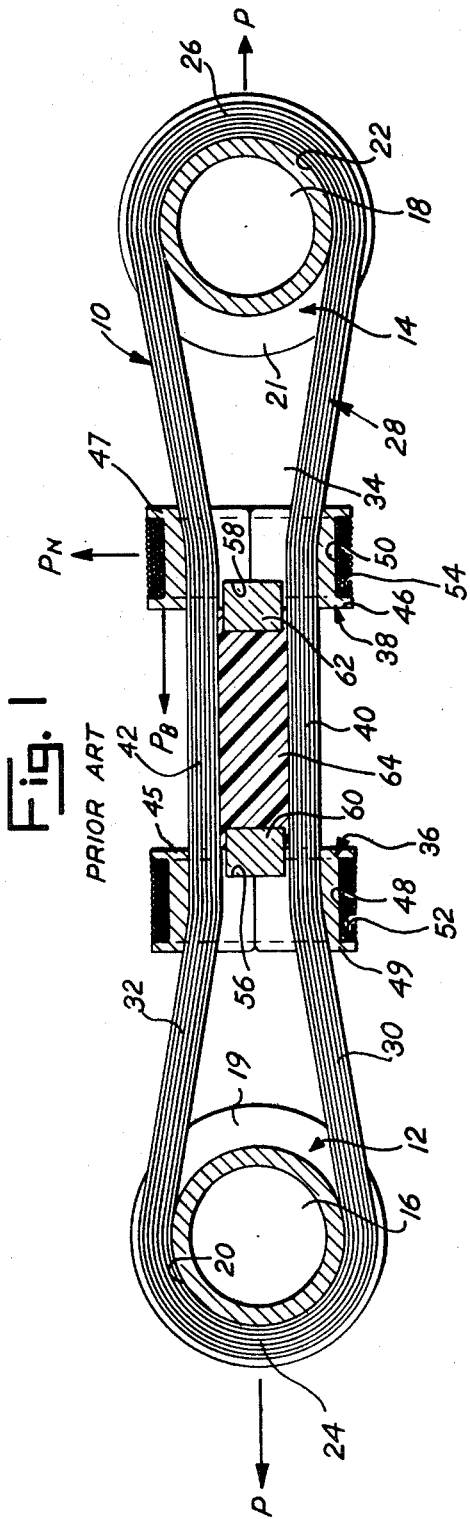
Figure 2:
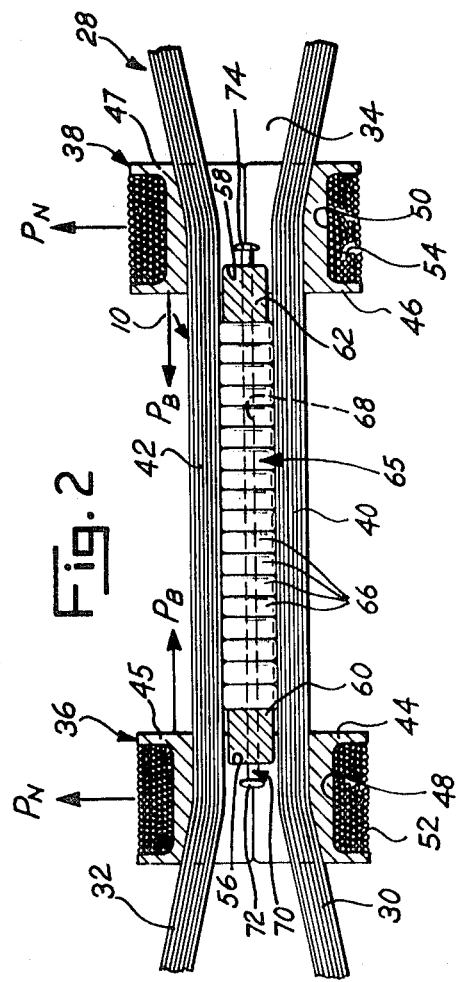

Yet another important object of my invention is to provide a tie bar that accomplishes all of the above objects yet having weight and strength characteristics as good as or better than existing designs. DESCRIPTION OF THE DRAWINGS FIG. 1 is a horizontal cross-sectional view of a laminated coupling know in the prior art; and FIG. 2 is a fragmentary cross-sectional view, similar to FIG. 1, of a laminated coupling made pursuant to the teachings of my present invention. DETAILED DESCRIPTION Referring now to the drawing, elements substantially the same in both of the FIGS. employ the same reference character. A laminated coupling 10 includes a pair of spaced-apart end bushings 12 and 14, each of which includes and opening 16, 18 extending therethrough that is adapted to receive a pin (not shown) for securing the coupling 10 to surrounding structure. Each of the bushings 12, 14 is of the type disclosed in U.S. Pat. No. 3,388,615, owned by the assignee of the present invention, and includes an upper flange (not shown) and a lower flange 19, 21 which define channels 20, 22 around the periphery of the bushings 12 and 14 that receive an end portion 24, 26 of an endless belt 28 that extends around each of the bushings 12 and 14. The belt 28 is composed of several layers of wirelike filaments integrated by a polyurethane adhesive, as disclosed in U.S. Pat. No. 3,460,628, assigned to the assignee of the present invention.

Belt 28 further includes a pair of opposed side portions 30, 32 which with the bushings 12, 14 define an opening 34 in the coupling 10. A pair of clips 36, 38 encircle the side portions 30, 32 at points adjacent each of the bushings 12 and 14 to draw the center sections 40, 42 of the side portions 30, 32 toward each other, so that the center sections 40 and 42 are generally parallel to one another. Each of the clips 36 and 38 consists of two half clips 44, 45 and 46, 47 to facilitate installation of the clips 36, 38 on the tie bar. The outer periphery of each clip 36, 38 is provided with a circumferentially extending channel 48, 50 which is adapted to receive wire filaments 52, 54 which are wrapped circumferentially around the clips 36, 38 to hold the half clips together.

When the coupling 10 is installed on an aircraft, the axially directed tension force P acting on the coupling results in a pair of force components acting on the clips 36 and 38. One of the force components $P_a$ acts radially outwardly from the center of the coupling and tends to separate the half clips 44, 45 and 46, 47. This force is resisted by the circumferential wraps of filament wire 52, 54. Another force, $P_B$, tends to slide the clips 36 and 38 toward the center of the bar. This force must also be resisted, but since the coupling must have low torsional stiffness, a solid, nondeformable member cannot be used as a core piece to maintain separation of the clips. Therefore, keyways 56 and 58 are provided in each of the clip assemblies 36 and 38 that receive mating cross pins 60 and 62 that extend through the opening 34. In the prior art device, a deformable urethane core piece 64 is interposed between the cross pins 60 and 62 to maintain proper separation between the latter. The urethane core is strong enough to prevent the clips from sliding, yet is deformable so that the coupling may twist, and performs quite satisfactorily in all but extremely adverse operating conditions. However, when the coupling illustrated in FIG. 1 is used at high temperatures in an oil bath, the urethane core piece 64 has a tendency to extrude between the cross pins 60, 62 and the belt 28, thus reducing the optimum life of the coupling.

In the improved coupling illustrated in FIG. 2, the urethane core 64 is replaced by an elongated core piece 65 which includes a plurality of solid, nondeformable laminations 66 disposed between the cross pins 60 and 62. Each of the laminations 66, and each of the pins 60 and 62, has a central bore 68 extending therethrough which slidably receives a rod 70. Each of the laminations 66 is permitted to rotate with respect to the pins 60 and 62 and with respect to all of the other laminations 66. Preferably, each of the laminations 66 may be coated with a low friction material, such as Teflon, to facilitate relative rotations between the laminations, and to reduce heat buildup in the coupling due to friction caused by relative rotation of the laminations. The ends 72, 74 of the rod 70 are preferably enlarged to prevent accidental withdrawal of the rod.

Therefore, it can be seen that the laminations act as a solid member to properly position the cross pins 60, 62 and therefore, the clips 36, 38 on the coupling 12. However, since the laminations 66 may rotate on the rod 70, the coupling has a very low torsional stiffness and is able to twist about an axis extending through the bushings 12, 14.

I Claim:

1. A coupling comprising:

a pair of spaced-apart bushings adapted to be connected to surrounding structure;

an endless belt interconnecting said bushings;

said belt having a pair of opposed end portions extending around said bushings and a pair of spaced side portions defining the sides of an opening in said coupling;

an elongated core piece disposed in said opening extending between said side portions;

said core piece including a plurality of interconnected members rotatable relative to one another about an axis extending through said bushings to permit twisting of the coupling about said axis.

2. The invention of claim 1; and means carried by said belt adjacent each of said bushings for drawing said side portions together to present a section of said coupling between said means having generally parallel sides;

said core piece extending between said means.

3. The invention of claim 2;

said means being a pair of clips encircling said belt; and a pair of cross pins extending through said opening and engaging said clips;

said core piece being disposed between said cross pins to thereby prevent movement of the cross pins relative to the belt.

4. The invention of claim 3:

said members being a plurality of laminations disposed between said pins;

each of said pins and each of said laminations having a central opening extending therethrough; and an assembly rod extending through each of said pins and each of said laminations.

5. A laminated coupling comprising:

a pair of spaced-apart bushings adapted to be connected to surrounding structure;

an endless belt encircling said end bushings;

said belt consisting of a series of layers of a filament material integrated by an adhesive material;

means carried by said belt adjacent each of said bushings defining a section of said belt between said means having spaced, generally parallel sides defining the sides of an opening through the belt; and members disposed in said opening between said means for locating the latter on said belt;

said members being rotatable relative to one another about an axis extending through said bushings to permit twisting of the coupling about said axis.

6. The invention of claim 5:

said means being a pair of clips encircling said belt;

a pair of cross pins extending through said opening;

each of said cross pins engaging one of said clips to prevent the latter from sliding toward the other clip.

7. The invention of claim 6:

said members being a plurality of laminations disposed between said pins; and means for interconnecting the laminations and the pins.

8. The invention of claim 7:

each of said pins and each of said laminations having a central opening therethrough;

said last-mentioned means being an elongated assembly rod; said rod extending through each of said central openings.